(12) United States Patent
Sasaki et al.

(10) Patent No.: US 7,692,115 B2
(45) Date of Patent: Apr. 6, 2010

(54) LASER PROCESSING DEVICE, LASER PROCESSING HEAD AND LASER PROCESSING METHOD

(75) Inventors: Yoshinari Sasaki, Tokyo (JP); Kosei Aso, Kanagawa (JP); Hidehisa Murase, Kanagawa (JP); Naoki Yamada, Kanagawa (JP)

(73) Assignee: Sony Corporation, Tokyo (JP)

( * ) Notice: Subject to any disclaimer, the term of this patent is extended or adjusted under 35 U.S.C. 154(b) by 333 days.

(21) Appl. No.: 11/933,719

(22) Filed: Nov. 1, 2007

(65) Prior Publication Data
US 2008/0210675 A1 Sep. 4, 2008

(30) Foreign Application Priority Data
Nov. 2, 2006 (JP) ............................. 2006-299526

(51) Int. Cl.
*B23K 26/00* (2006.01)
*B23K 26/12* (2006.01)
(52) U.S. Cl. ............................. 219/121.84; 219/121.86
(58) Field of Classification Search .. 219/121.6–121.86
See application file for complete search history.

(56) References Cited

U.S. PATENT DOCUMENTS

| | | | | |
|---|---|---|---|---|
| 4,027,137 A | * | 5/1977 | Liedtke | 219/121.7 |
| 4,031,351 A | * | 6/1977 | Martin | 219/121.67 |
| 4,121,085 A | * | 10/1978 | Diemer et al. | 219/121.84 |
| 6,530,317 B2 | * | 3/2003 | Gelbart | 101/31.1 |
| 2004/0226927 A1 | * | 11/2004 | Morikazu et al. | 219/121.84 |

FOREIGN PATENT DOCUMENTS

| | | |
|---|---|---|
| GB | 2435844 A | 9/2007 |
| GB | 2438527 A | 11/2007 |
| JP | 09-192870 | 7/1997 |
| JP | 10-099978 | 4/1998 |
| JP | 2004-230458 | 8/2004 |
| JP | 2005-177786 | 7/2005 |
| JP | 2006-122989 | 5/2006 |

OTHER PUBLICATIONS

United Kingdom Intellectual Property Office Search Report issued on Feb. 10, 2008 in connection with GB0719922.7.
Japanese Office Action issued on Aug. 19, 2008.

* cited by examiner

*Primary Examiner*—Sang Y Paik
(74) *Attorney, Agent, or Firm*—Sonnenschein Nath & Rosenthal LLP

(57) ABSTRACT

Disclosed is a laser processing device. The laser processing device includes a laser beam source irradiating a laser beam, and a laser processing head. The laser processing head includes a transmitting window through which the laser beam passes, an aperture formed in a bottom of the laser head and allowing the laser beam to pass through via the transmitting window, an introducing hole introducing a gas into the laser processing head, and an exhausting hole discharging a gas in the laser processing head to outside. The laser processing head further includes a air hole introducing the gas to the periphery of the laser irradiating area, an air hole allowing to discharge the ambient gas of the laser irradiating area, and a masking shield having an opening placed between the transmitting window and the aperture, and an aerating portion communicated with the introducing hole and exhausting hole.

12 Claims, 7 Drawing Sheets

LASER PROCESSING DEVICE, LASER PROCESSING HEAD AND LASER PROCESSING METHOD

CROSS REFERENCES TO RELATED APPLICATIONS

The present invention contains subject matter related to Japanese Patent Application JP 2006-299526 filed in the Japanese Patent Office on Nov. 2, 2006, the entire contents of which being incorporated herein by reference.

BACKGROUND OF THE INVENTION

1. Field of the Invention

The present invention is concerned with a technology of patterning a resin film or thin metal film on a multilayer thin film such as a FPD (Flat Panel Display). Specifically, the present invention relates to a laser processing device, a laser processing head and a laser processing method for clearing and collecting scattered pieces of a material or debris generated by laser processing in ablation, thermofusion, or interactive effects thereof in which a surface of a material is irradiated with a laser beam.

2. Description of the Related Art

Recent competition in developing and enhancing high-precision flat panel displays (FPDs) with lower cost has been accelerating the manufacture of FPDs with higher qualities and high productivities.

A display panel of the FDP has generally been manufactured by photolithography. In photolithography, however, much attention has been brought on various concerns. For example, devices are likely to have an increased size, and an environmental protection may have to be prepared when using a developing solution or a chemical solution. Further, the photolithography may need two steps in patterning due to the use of different types of resists or developing solutions compared to other types of patterning. In consequence, a technology to directly process a film by laser beams is now widely used in place of photolithography.

An example of the laser used for the aforementioned direct processing includes a short-wavelength laser such as an excimer laser. A typical excimer laser or excited dimmer laser has high photon energy capable of breaking off chemical bonds. The excimer laser can cause ablation of a material, which involves photochemical decomposition or photothermal decomposition, by irradiating a material with a short pulsed laser having a short-wavelength, and can remove or micropattern the material while controlling thermal effects. Such laser processing technology including ablation is currently attracting much attention. Various materials such as plastic (polymeric material), metal, and ceramics can be processed in ablation by irradiating the material with an excimer laser beam having controlled energy density.

In ablation processing using a laser, the material processed usually acquires scattered pieces generated from the surface of the processed material irradiated with a laser beam to the periphery of the processed area. Such scattered pieces of the material are generally called debris. If debris is generated and attached to the periphery of the processing area, neither desired quality nor can desired processing accuracy be obtained. Thus, attempt has been made to study and develop a method of decreasing the debris.

For example, Japanese Unexamined Patent Application Publication No. H10-99978 discloses a device for clearing debris having a fluid delivering device that spouts fluid such as air to the surface around the processed area of a material, and a suction duct located opposite of a fluid spouting outlet that suctions the debris from the processed area of the material (hereinafter called "a first technique").

Moreover, it is generally known in the art that the amount of debris attached to a material can be decreased if an assist gas is spouted around the laser irradiated area simultaneously when irradiating the material with a laser beam. For example, Japanese Unexamined Patent Application Publication No. H09-192870 discloses a device for clearing debris having a laser processing head including an internal nozzle that spouts an assist gas to the processing area and an external nozzle provided on the outer circumference of the internal nozzle that suctions the spouted gas with the debris. (hereinafter called "a second technique"). It is known in the art that the generation of debris can be prevented by decomposing debris using a prescribed gas. It is also known in the art that the amount of debris accumulated on the material can significantly be reduced by irradiating the material with a laser beam under reduced pressure of vacuum level approximately 10 [Pa] ($10^{-2}$ Torr).

Japanese Unexamined Patent Application Publication No. 2004-230458 discloses a device for controlling accumulating debris having an opening 120 provided immediately above a processing material 107 stacked on a processing film 108 on a substrate 108a and an exhausting device that decompresses a closed space formed with a mask or variable aperture 104 and an opening 120, where the debris 121 generated by irradiating the material 107 with a laser beam 102 is cleared and the discharged debris 121 is accumulated in the opening 120. As a result, accumulation of the debris on the processing material 107 (hereinafter called "a third technique") is controlled.

SUMMARY OF THE INVENTION

According to embodiments of the present invention, most of the debris scattered in the periphery of the processing as shown in Japanese Unexamined Patent Application Publication No. H10-99978 can be cleared and collected.

According to embodiments of the present invention, most of the debris reattached in the periphery of the processing as shown in Japanese Unexamined Patent Application Publication No. H09-192870 can be cleared and collected.

According to embodiments of the present invention, most of the debris accumulated in the center of the processing area that are reattached to the surface of the material as shown in Japanese Unexamined Patent Application Publication No. 2004-230458 can be cleared and collected.

In processing a metal thin film, adequate conditions will largely depend on the wavelength of a laser beam, energy intensity, pulse width, the number of irradiated pulses, and physical properties of a material, film thickness, and film composition. The material can be removed and micropatterned by heating ablation and thermal reaction due to laser beam irradiation. Further, an adverse effect due to heat can be decreased if irradiated with a laser beam having a shorter pulse width. Although the debris is cleared by spouting an assist gas to disperse the debris as shown in technique 2 in Japanese Unexamined Patent Application Publication No. H09-192870, an adverse effect such as short circuit on the quality of the laser processed product may arise due to reattaching dross (products due to head) or debris generated around the processing area if the material processed is a thin film used for an electrode.

Laser beams are absorbed in an irradiated area of a thin metal film on a multilayer film to generate heat, and the thin metal film is then melted and evaporated to proceed with etching. The melting temperature of the thin metal film is higher than that of a resin. Thus, if the resin layer is disposed below the thin metal film, the resin film may melt and vaporize due to the effect of the heat on the resin film, thereby interfering the etching of the thin metal film. The resin layer below the thin metal film may, for example, heave or protrude through the thin metal film. Accordingly, if attempting to etch the thin metal film only without affecting the resin layer below the film, it is preferable to develop a mechanism for collecting debris by lowering the temperature in heat-melting and vaporizing the film.

Moreover, a resin film (polymeric material) can be processed without a thermal damage by ablation involving photochemical decomposition and photothermal decomposition. In the ablation, the etching depth can be controlled by changing the intensity of irradiating energy and the number of pulses of a laser beam, and the reproducibility can be obtained. Thus, the ablation technique may be applied to a 3-D processing technique, or the like. However, a desired micropatterning may not be obtained due to accumulation of debris generated in the aforementioned ablation and hence may impose an adverse effect on the quality of the processed product.

According to embodiments of the present invention, debris attached to the processed material can be efficiently cleared and collected in laser processing.

According to an embodiment of the present invention, a laser processing device in patterning a resin film or thin metal film on a multilayer film formed in the material using a laser beam includes a laser beam source and a laser processing head. The laser processing head includes a transmitting window through which the laser beam passes to irradiate a material, an aperture formed in a bottom of the laser head and allowing the laser beam to pass through via the transmitting window, an introducing hole introducing a gas into the laser processing head, and an exhausting hole discharging an ambient gas contained in the laser processing head to outside. The laser processing head further includes a first air hole introducing the gas to the periphery of the laser irradiating area of the material, a second air hole placed to face the first air hole and allowing to discharge the ambient gas around the laser irradiating area of the material, and a masking shield having an opening placed between the transmitting window and the aperture, and an aerating portion communicated with the introducing hole and exhausting hole. In the laser processing device of this embodiment, debris generated around a laser irradiating area of the material is discharged via the second air hole communicated with the aperture formed in the bottom of the laser processing head, and are caused to attach to the periphery of the masking shield in patterning a resin film or thin metal film on a multilayer film formed in the material.

According to this embodiment, the laser irradiating area is allowed to have reduced pressure, and the debris can be entrapped with the masking shield. Thus, the debris generated by laser processing can efficiently be cleared and collected.

According to an embodiment of the present invention, a laser processing head in patterning a resin film or thin metal film on a multilayer film formed in the material using a laser beam includes a transmitting window through which a laser beam passes to irradiate a material, an aperture formed in a bottom of the laser head and allowing the laser beam to pass through via the transmitting window, an introducing hole introducing a gas into the laser processing head, and an exhausting hole discharging an ambient gas contained in the laser processing head to outside. The laser processing head further includes a first air hole introducing the gas to the periphery of the laser irradiating area of the material, a second air hole placed to face the first air hole and allowing to discharge the ambient gas around the laser irradiating area of the material, and a masking shield having an opening placed between the transmitting window and the aperture, and an aerating portion communicated with the introducing hole and exhausting hole. In the laser processing head of this embodiment, debris generated around a laser irradiating area of the material is discharged via the second air hole communicated with the aperture formed in the bottom of the laser processing head, and are caused to attach to the periphery of the masking shield in patterning a resin film or thin metal film on a multilayer film formed in the material.

According to this embodiment, the laser irradiating area is allowed to have reduced pressure, and the debris can be entrapped with the masking shield. Thus, the debris generated by laser processing can efficiently be cleared and collected.

According to embodiments of the present invention, there is provided a method of laser processing a resin film or thin metal film on a multilayer film formed in the material using a laser processing head. The laser processing head includes a transmitting window through which the laser beam passes, an aperture allowing the laser beam to pass through via the transmitting window, a first and second introducing holes introducing a gas into the laser processing head, a first and second exhausting holes discharging an ambient gas contained in the laser processing head to outside. The laser processing head further includes a first air hole introducing the gas to the periphery of the laser irradiating area of the material, a second air hole placed to face the first air hole and allowing to discharge the ambient gas around the laser irradiating area of the material, and a masking shield having an opening placed between the transmitting window and the aperture, and an aerating portion communicated with the first introducing hole and first exhausting hole. The method using the laser processing head includes the steps of introducing a gas from the second introducing hole provided in a prescribed location of the laser processing head to the periphery of a laser irradiating area of the material, introducing the gas into an aeration portion of the masking field via the first introducing hole, irradiating the material with the first laser beam, and displacing a stage for mounting the material a prescribed distance in the opposite direction to airflow of the introduced gas. The method further includes discharging an ambient gas of the laser irradiating area of the material from the second introducing hole provided in the prescribed location of the laser processing head, introducing the ambient gas inside the laser processing head from the opening of the masking shield and discharging the gas from the first exhausting hole via the aeration portion, and irradiating part of a first irradiating area of the material twice with a second laser beam while discharging the gas via the first and second exhausting holes.

According to this embodiment, the debris can be collected in a desired area by causing to move airflow around the laser irradiating area in one direction when irradiating the material with a laser beam. Further, according to this embodiment, the debris remained on a surface of the material can be cleared and collected by irradiating part of the surface twice with a laser beam, so that the first irradiating area and the second irradiating area are partially overlapped.

According to embodiments of a laser processing device, a laser processing head and a laser processing method of the present invention, the debris generated by laser processing can efficiently be cleared and collected.

DESCRIPTION OF THE PREFERRED EMBODIMENTS

A first embodiment of the present invention will be illustrated with reference to FIG. 2 to FIG. 8. A laser device for ablation according to the first embodiment of the present invention includes laser light source and an optical system optically projecting a laser beam irradiated from the laser light source to a surface of a material in a prescribed pattern.

Figure 1:
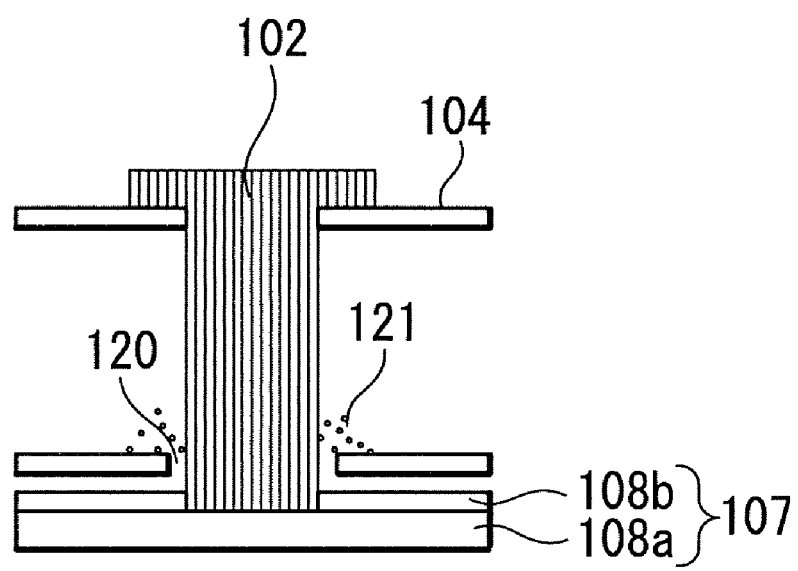
FIG. 1 is a cross-sectional view of the periphery of an opening of a laser processing device according to the related art.
Figure 2:
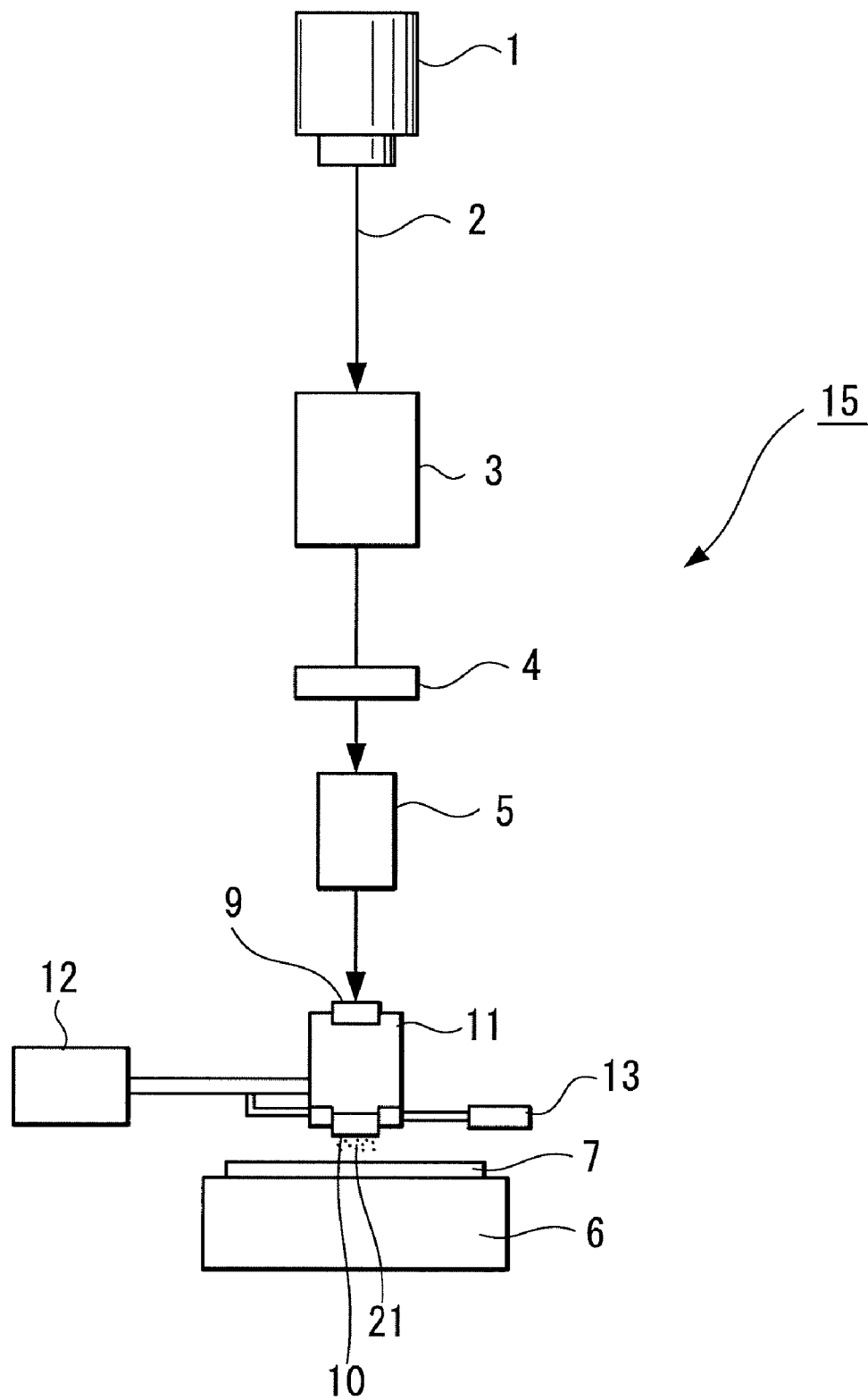
FIG. 2 is an outlined configuration diagram of a laser processing device according to a first embodiment of the present invention.

FIG. 2 is a diagram illustrating one example of an outlined configuration of a laser processing device according to the first embodiment of the present invention. A laser processing device 15 shown in FIG, 2 includes laser light source 1, a beam former 3, a mask or a variable aperture 4, a projection lens 5, a stage 6, a decompression chamber 11 (or a laser processing head), an exhausting device 12 such as a ruffing pump, and a gas introducing device 13, and ablates the surface of a material 7.

An example of the laser source includes an excimer laser. The excimer laser has various types differing in laser media, examples of which include XeF (351 nm), XeCl (308 nm), KrF (248 nm), ArF (193 nm), and $F_2$ (157 nm) given from the longest wavelength.

The significant difference between an excimer laser and other lasers using heat energy to process a material such as a YAG laser (fundamental wavelength: 1.06 microns) and a $CO_2$ laser (fundamental wavelength: 10.6 microns) is that the oscillation wavelength of the excimer laser usually falls within the ultraviolet wavelength range. The excimer laser is essentially pulse oscillated and has a short pulse of several to several tens of nanoseconds or less). Further, the excimer laser can carry out ablation, which is thermally unaffected processing, by irradiating the material with a short pulsed laser with short-wavelength to cause photochemical decomposition or photothermal decomposition, such that the processed surface has significantly acute edges. In contrast, the periphery of a surface processed by irradiating the YAG laser and the CO2 laser may not form acute edges due to a large thermal effect and thus may not be end faces.

The excimer laser has sectional dimensions of a beam of 10×10 mm obtained immediately irradiated from the laser beam source 1. The sectional dimensions of the laser beam may be reduced, or increased in lengthwise or/and widthwise directions at the beam former 3 according to purposes of processing. A large area of the material can simultaneously be processed by increasing the sectional dimensions of the laser beam. The excimer laser may thus be suitable for simultaneously processing a large area of the material. Further, the material can be microfabricated with high precision by decreasing the sectional dimensions of the laser beam. A relatively large area of the material can also be patterned by step-and-repeat technique.

The beam former 3 may modify the dimensions of the laser beam irradiated from the laser light source 1 or uniform the intensity of the beam to output the resulting laser beam.

The mask or variable aperture 4 includes a prescribed pattern which the laser beam 3 modified at the beam former 3 can pass through or transmit. Examples of the mask or variable aperture 4 include a mask having an aperture made of a metallic material, a photomask made of a transparent glass material or a metallic thin film, and a dielectric mask made of a dielectric material.

A projection lens 5 projects the laser beam passing through the pattern of the mask or variable aperture 4 to the processing surface of the material 7 on a stage 6 by a prescribed magnification.

The stage 6 is located such that the laser beam projected from the projecting lens 5 is focused on the processing surface of the material 7. The stage 6 includes an X-Y stage or a three axis stage capable of movably locating the material 7 along the plane perpendicular to a light path 2 or an optical axis of the laser beam so that the laser beam can scan across the surface of the material 7.

The laser processing device 15 including such a configuration may employ an excimer laser as laser light source 1 and may ablate the surface of the material 7 by the irradiation of the laser beam in a prescribed pattern. The processed surface of the material 7 usually acquires scattered pieces or debris generated from the material 7 by ablation. When the processed surface of the material 7 acquires the debris, the quality and the precision of the material may be adversely affected. The first embodiment of the present invention can prevent the debris from being attached to the surface of the material 7.

For example, the decompression chamber 11 (laser processing head) made of quartz for a KrF laser or calcium fluoride for an ArF laser is provided above the material 7 on the stage 6. The decompression chamber 11 includes an approximately cylindrical shape and an upper transmitting window 9 transmitting the excimer laser, and is made of aluminum or stainless steel. The decompression chamber 11 includes a local exhausting function at the bottom 10 so that the gas inside the decompression chamber 11 can be discharged to the outside, and an external gas is introduced into the decompression chamber 11 by a gas introducing device 13.

In the laser apparatus according to the first embodiment of the present invention, the bottom 10 of decompression chamber 11 is located extremely close to the material 7 with a processing film such as a resin film or metal thin film deposited thereon. The ambient gas of the laser irradiated area of the processing film is exhausted via an exhausting hole. This can reduce atmospheric pressure around the laser irradiated area of the processing film with a simple configuration and increase the sublimation pressure of the processing film in irradiating it with a laser beam to remove the processing film from the resin film located below the metal thin film. As a result, the irradiation energy for processing can be decreased, and the debris generated from the resin layer by laser irradiation can be removed and collected via the exhausting hole, and as a result, the debris coming off from the resin layer by laser irradiation can be cleared from the material and be collected via the exhausting hole. The debris generated from the resin layer can be removed by spouting fluid such as air from the fluid delivering device or a gas introducing device located on the surface close to the processing area of the material.

Figure 3:
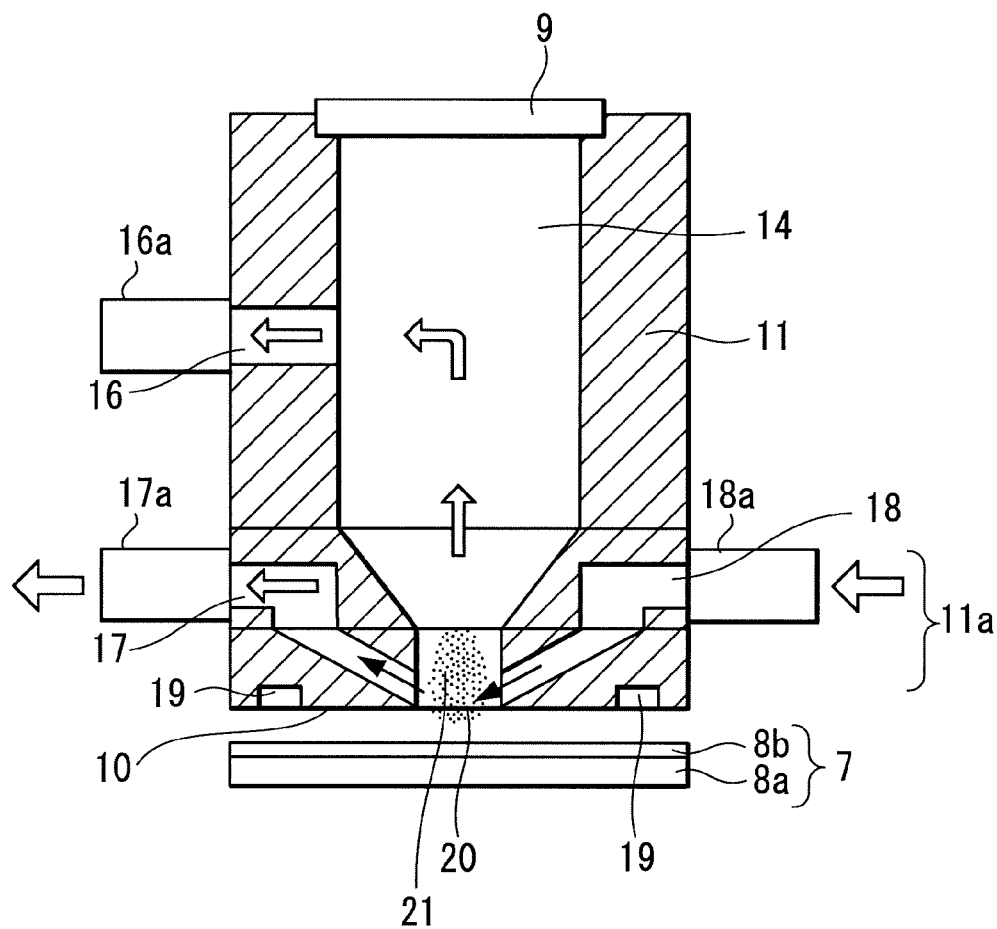
FIG. 3 is an outlined cross-sectional view of a decompression chamber according to the first embodiment of the present invention.
Figure 4:
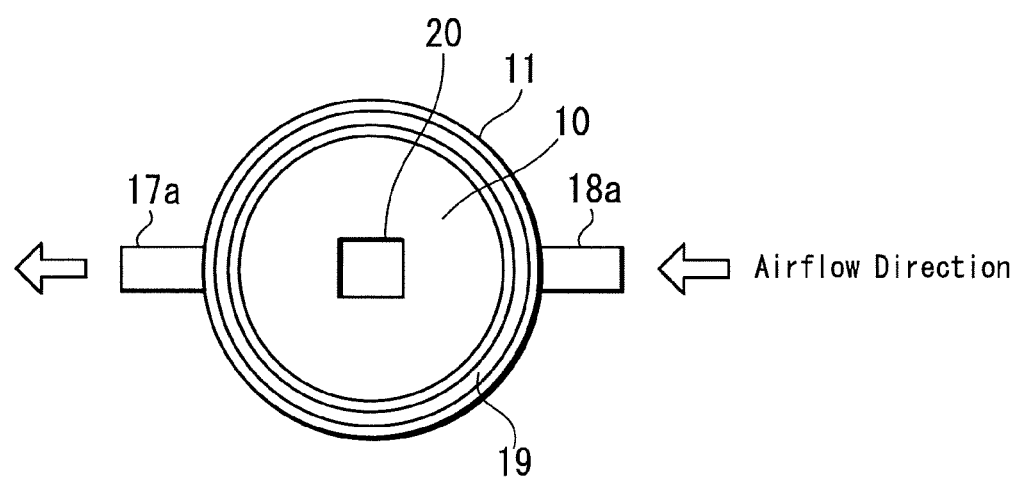
FIG. 4 is a first bottom view of the decompression chamber according to the first embodiment of the present invention.

FIG. 3 is an outlined sectional view and FIG. 4 is a bottom view of the decompression chamber 11. The decompression chamber 11 has an approximately cylinder shape including a transmitting hole 14 formed in the center thereof and located at a position with a predetermined distance from the surface of the material 7 having a multilayered film including the processing film 8b such as a resin film or metal thin film deposited on the substrate 8a. The processing film 8b including the multilayered film may be deposited on a resin layer (not shown). However, depositing the processing film 8b may not be limited to the resin layer.

The decompression chamber 11 includes an upper portion and a lower portion. The upper portion of the decompression chamber 11 includes an exhausting hole 16 communicated with the transmitting hole 14 and connected to the exhausting device 12 via a pipe 16a. The lower portion of the decompression chamber 11 includes air holes 17, 18 mutually faced, both of which are communicated with the transmitting hole 14. The bottom 10 of the decompression chamber 11 includes an aperture 20 in the approximately center thereof, through which a laser beam from an upper transmitting window 9 is passed and a gas spout groove 19 (see FIG. 4) provided in the outer circumference concentric with the decompression chamber 11. The air hole 17 is connected with the exhausting device 12 via the pipe 17a and the air hole 18 is connected with the gas introducing device 13 via the pipe 18a. The air holes 17, 18 are communicated with the space around the aperture 20 with a certain angle to the bottom 10 so that a gas flowing inside the air hole 17, 18 can be introduced to the periphery of the laser irradiation area of the material 7 and the ambient gas of the irradiation area can be discharged. The lower portion of the decompression chamber 11 having the air holes 17, 18 and the aperture 20 is referred to as a gas introducing-exhausting unit 11a in the first embodiment of the present invention.

The decompression chamber 11 is vacuumed (approximately to $10^{-2}$ Torr at the maximum in this embodiment) using the exhausting device 12 externally provided to the decompression chamber 11, and the ambient gas of the surface of the material 7 is discharged via the exhausting hole 16 and the air hole 17. The diameter of the aperture 20 is approximately the same size as or slightly larger than the maximum processing beam size. In this case, the diameter of the aperture 20 is the maximum processing beam size plus 1 mm or less.

The distance between the bottom 10 of the decompression chamber 11 and the irradiation surface or the surface of the processing film of the material 7 is maintained at 100 microns or less by spouting the gas from the circular gas spouting groove 19. The spouting gas is introduced from the floating gas introducing device (not shown). Since the conductance is decreased at the discharge of the ambient gas via the exhausting holes 16, 17, the vacuum in the space between the bottom 10 of the decompression chamber 11 and the material 7 is lower than 1 atmosphere. The processing film 8b removed by the laser irradiation under the reduced pressure has higher sublimation pressure to separate the processing film from the resin film located therebelow than that obtained in irradiating the film with a laser beam under one atmosphere. In addition, the processing film 8b removed is collected via traveling the exhausting hole 16 and the air hole 17.

The filter (not shown) is provided at the exhausting device 12 and the exhausting hole 16 to collect the debris. Moreover, it is also possible to discharge the debris via the exhausting hole 16 and the air hole 17 instead of the pipe in the exhausting device 12. Moreover, it is also possible to discharge the debris via the exhausting hole 16 and the air hole 17 respectively provided in the two exhausting devices 2.

Thus, the gas pressure around the laser irradiated area of the processing film can be reduced with a simple configuration having a local exhausting function. The processing energy can be lowered, the debris can be removed and collected without productivity by irradiating the material with a laser beam under the reduced pressure.

Figure 5A:
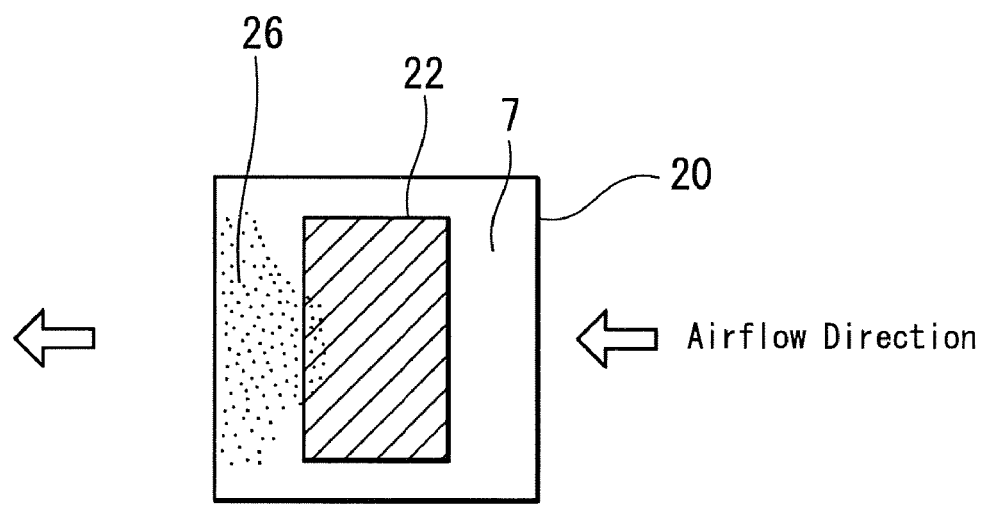
FIGS. 5A, 5B are respectively a top view and a side view illustrating an example of scattered debris according to the first embodiment of the present invention.
Figure 5B:
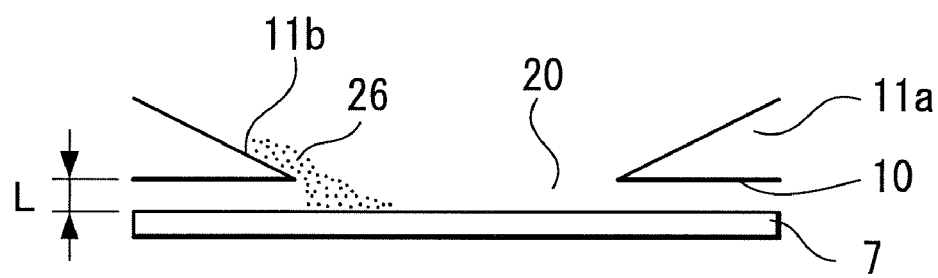

FIGS. 5A, 5B are an example of scattered debris in the laser processing according to the first embodiment of the present invention; FIG. 5A is a top view of the periphery of the processing area and FIG. 5B is a side view of the periphery of the processing area.

According to the first embodiment of the present invention, the gas is introduced from the air hole 18 into decompression chamber 11 (laser processing head) via the pipe 18a, and simultaneously discharged from the exhausting hole 16 and the air hole 17 via the pipes 16a and 17a as shown in FIG. 4. As a result, airflow is generated around the laser irradiated area of the material 7 as shown in FIG. 4. In this condition, if a certain processing area of the material 7 is irradiated with a laser beam, undischarged the debris 26 from the exhausting hole 16 and the air hole 17 are carried by an airflow and unevenly accumulated around one side (left in FIG. 6) of the irradiated area 22 (see FIG. 5A).

Thus, the diameter of the aperture 20 of the decompression chamber 11 and the distance L between the bottom 10 of the decompression chamber 11 and the irradiation surface of the material 7 may appropriately be adjusted or set. This adjustment can reduce the area having the scattered pieces or debris accumulated around the processing area. The adjustment can control the amount of accumulated debris by allowing the debris to accumulate on a slope 11b if the debris 26 has spread around the processing area of the material 7.

Accordingly, reattachment of the debris 26 to the surface of the material 7 can be prevented by controlling the area of the debris 26 generated by ablation using a laser beam at the aperture 20 and allowing the debris 26 to accumulate around the aperture 20.

Figure 6:
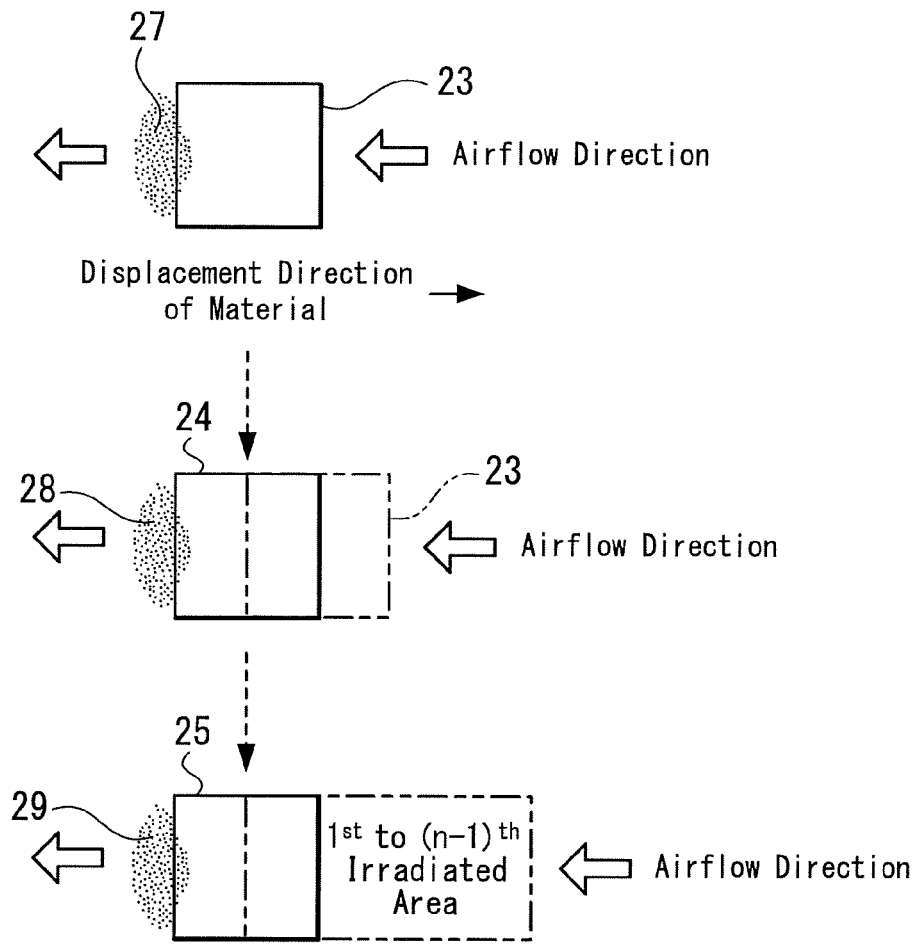
FIG. 6 is an explanatory diagram of a laser processing method according to the first embodiment of the present invention.

Next, a laser processing method used in the aforementioned laser processing device will be described with reference to FIG. 6. FIG. 6 illustrates a method in which scattered pieces or debris have not been removed from a material 7 by irradiating with a first-shot laser beam are removed by irradiating a second-shot laser beam while introducing a gas onto the surface of the material 7 in the patterning direction.

First, inner pressure of the decompression chamber 11 is controlled to a prescribed reduced pressure by adjusting a gas exhausting flow via the exhaust hole 16 and the air hole 17, and a gas introducing flow via the air hole 18. The distance between the bottom 10 of the decompression chamber 11 and the processing surface of the material 7 is maintained at a certain distance by spouting a floating gas from a gas spouting hole 19.

The gas is introduced to the periphery of the laser processing area to cause the airflow to flow from right to left in FIG. 6, and the processing area is then irradiated by a first laser irradiation. The gas is simultaneously discharged while irradiation. Debris 27 accumulate on the left side of a first irradiating area 23 of the material 7 irradiated with the laser beam. Next, the stage 6 on which the material 7 is mounted is moved in the direction of the patterning, that is, in the direction opposite to the introduced airflow in the first embodiment. The irradiating area of the material 7 is irradiated such that the first irradiating area irradiated with a first-shot laser beam and the second irradiating area irradiated with a second-shot laser beam are partially, specifically, approximately 50% overlapped, while introducing the gas to the periphery of the laser irradiation area of the material 7 and discharging the gas the above-mentioned and atmosphere concerned is exhausted.

Consequently, the debris 27 generated by the first-shot laser beam irradiation and reattached to the material 7 is discharged via the exhaust hole 16 and the air hole 17 and collected by carrying out the overlapping irradiation. At this time, additional debris 28 is generated in the airflow direction or on the left side of the second irradiating area 24.

Similarly, the stage 6 on which the material 7 is mounted is displaced in the patterning direction, which is the opposite direction to the airflow, and a step of irradiating the material 7 with a laser beam is repeated. Debris 29 accumulate in the processing area on the leeward side of an $n^{th}$ irradiating area and the debris 29 reattached to the first to $(n-1)^{th}$ irradiating area by the first to the $(n-1)^{th}$ shot laser irradiation can be cleared and collected.

In this embodiment, approximately 50% of the laser processing area is irradiated twice with the laser beam; however, the area irradiated twice is not limited thereto. As examples of the gas delivered from the gas introducing device includes Oxygen ($O_2$), helium (He), and argon (Ar), and the like in this example.

Next, a modification of the first embodiment of a laser processing device will be described.

Figure 7:
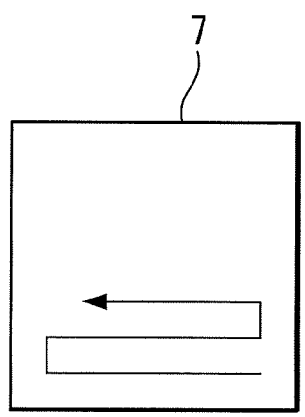
FIG. 7 is a diagram illustrating one example of a laser processing path for a material according to the first embodiment of the present invention.

In practice, an array substrate or multilayer film substrate such as a flat display is used as the material 7 processed. In the substrate, the patterning direction or the laser patterning path on the material 7 may have to be changed a plurality of times as shown in FIG. 7. In this modification, the air hole 17 is provided with a function to discharge an ambient air and also provided with a function to introduce a gas to the laser irradiated area of the material 7. Further, the air hole 18 is provided with a function to introduce a gas and also provided with a function to discharge the ambient gas of the laser irradiated area of the material 7. Providing the air holes 17 and 18 may allow to switch the direction of the gas communicated between the air holes 17 and 18 to be switch in compliance with the patterning direction for the material 7. The air holes 17 and 18 are communicated with the exhausting device 12 and the gas introducing device 13, respectively. An opening and closing device such as a solenoid valve is interposed in the paths between the air holes and the exhausting device 12 and the gas introducing device 13 and switches to introduce or discharge the gas by the opening and closing device.

Specifically, when the material 7 is laser processed in right to left direction as shown in FIG. 7, the airflow is caused to flow in right to left or a pipe 18a to pipe 17a direction as shown in FIG. 4. Conversely, when the material 7 is laser processed in left to right or the pipe 18a to pipe 17a direction, the airflow is caused to flow in left to right or a pipe 17a to pipe 18a direction as shown in FIG. 4.

The direction of the fluid flowing through air holes 17 and 18 formed in the gas introducing-exhausting unit 11a can be switched according to the patterning direction.

Next, another modification of the first embodiment of a laser processing device will be described.

In this embodiment, the turning mechanism having a turnable axis approximately in parallel with a laser beam path is provided in the gas introducing-exhausting unit 11a having the air holes 17 and 18 provided in the lower portion of the decompression chamber 11 (laser processing head). The direction of introducing or exhausting airflow from or to the periphery of the material 7 through the air holes 17 and 18 may be switched by turning the gas introducing-exhausting unit 11a in compliance with the patterning direction for the material 7. Thus, the direction of introducing or exhausting airflow is adequately changed in compliance with the patterning direction of the material 7 (see FIG. 7). The direction of the airflow can simply and automatically be changed according to this embodiment.

Referring back to FIG. 4, when the patterning direction makes 180 degree turn, the decompression chamber 11 is made a 180 degree turn to reverse the airflow direction from left to right. When the material is patterned in the direction from bottom to top of FIG. 4, the decompression chamber is made a 90 degree turn in the right direction to change the airflow in the direction from top to bottom of FIG. 4.

In the above description, the decompression chamber 11 includes the turning mechanism by which the gas introducing-exhausting unit 11a can be turned. In other words, the decompression chamber 11 includes the mechanism by which only part of the decompression chamber 11 can be turned. It is also possible to include the mechanism by which the entire decompression chamber can be turned.

Figure 8:
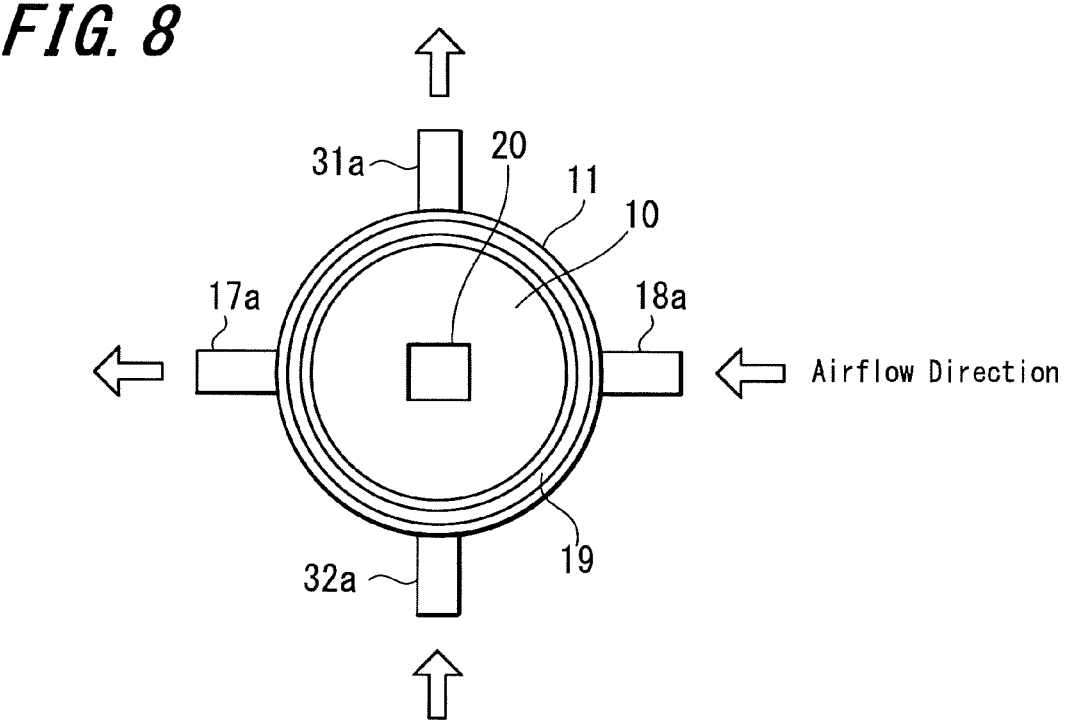
FIG. 8 is a second bottom view of the decompression chamber according to the first embodiment of the present invention.

Further, still another modification of the first embodiment of a laser processing device will be described. FIG. 8 is a bottom view of the decompression chamber 11 according to the first embodiment of the present invention. FIG. 8 illustrates an embodiment which further includes suction (gas introduction) and exhaust functions in FIG. 4 placed in the gas introducing-exhausting unit per 90 degree turn in a radial direction. This enables to reduce time for the unit to switch between two directions X and Y when patterning the material 2.

In FIG. 8, the decompression chamber 11 or laser processing head includes the third and fourth air holes (or pipes 31a and 32a) placed in the gas introducing-exhausting unit per 90 degree turn in a radial direction relative to the pipe 17a (air hole 17) and the pipe 18a (air hole 18) that are mutually faced, and the ambient gas is introduced to or discharged from the periphery of the laser irradiating area through the pipes 31a and 32a or air holes. With this configuration, one of the pair having the air holes 17, 18 and the pair having the third and fourth holes (pipes 31a, 32a) can be selected and switched in compliance with the patterning direction for the material 7.

According to an embodiment of the present invention, the air holes are provided in the gas introducing-exhausting unit per 90 degree turn in a radial direction. This enables switching time to be reduced without turning the gas introducing-exhausting unit. In this embodiment, since there is little rotational displacement in patterning, little error is acquired in measuring mechanical precision as compared to the embodiment in FIG. 4. Thus, excellent precision can be obtained in patterning the material.

As already described, according to the first embodiment of the present invention, the debris attached to the processed material can be efficiently cleared and collected in laser processing based on ablation or thermofusion by reducing an adverse effect due to heat.

As a result, an excellent effect can be obtained in laser processing with high precision while controlling debris attached to the material. This enables to have a broader range of applications in laser processing, and higher precision micro-patterning can be formed on the material at lower cost.

Next, a second embodiment of the present invention will be illustrated with reference to FIG. 9 to FIG. 12.

The laser ablation for a thin metal film on the multilayer film is performed by irradiating the surface of the material with a laser beam and the irradiated surface evaporates due to thermofusion. An adverse effect on the periphery of ablated area due to heat can be controlled by lowering irradiation energy under a reduce pressure and by restricting suitable energy conditions and the number of shots. However, the debris generated by irradiating the material with a laser beam forms a balloon-shaped mass called "plume". The plume is diffused according to the distribution of cos ρ, simultaneously with ascending at an initial velocity of several tens of meters per sec. Thus, it is insufficient only to introduce or exhaust a fluid into or from the decompression chamber 11 for the debris to be completely cleared and collected from the processed surface of the material. The debris is likely to be attached to the upper transmitting window 9 of the decompression chamber 11 in FIG. 8, and a desired quality may not be obtained for the laser processed material as a result. It may be difficult to collect the debris ascending at the initial velocity in thermofusion and evaporation. In this case, the debris attached to the upper transmitting window 9 is suppressed by entrapping the debris using the masking shield.

Figure 9:
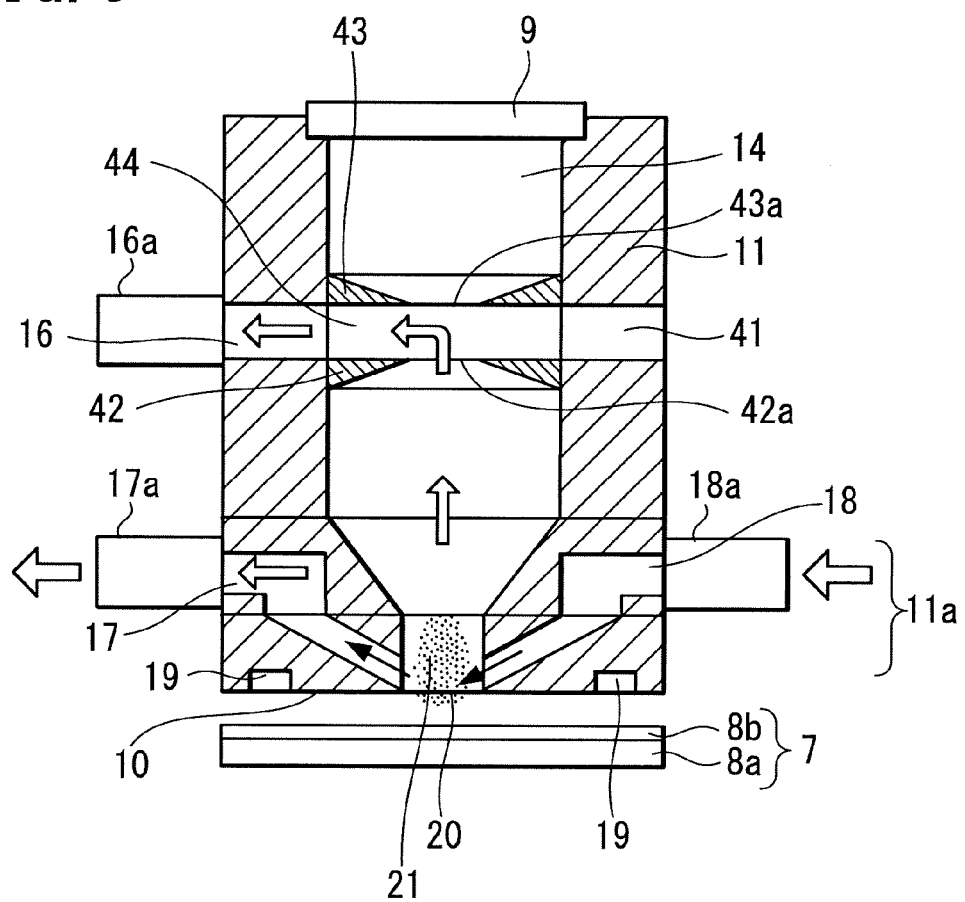
FIG. 9 is an outlined cross-sectional view of a decompression chamber according to a second embodiment of the present invention.

FIG. 9 is an outlined cross-sectional view of a decompression chamber according to a second embodiment of the present invention. In FIG. 9, the same numerals and symbols are provided with the portions corresponding to FIG. 3, and the detailed description will thus be omitted. The decompression chamber in FIG. 9 has two differences compared with the one in FIG. 3. The first difference indicates that the decompression chamber in FIG. 9 includes masking shields placed between the upper transmitting window 9 and an aperture 20 of the decompression chamber 11, each having an opening in the center thereof. The embodiment shown in FIG. 9 employs a combination of the masking shields 42 and 43. The second difference indicates that an air exhausting hole 16 and an air introducing hole 41 are formed in the decompression chamber 11 with an optical axis of the laser beam located in the center of the cylindrical surface of the decompression chamber 11 between the air introducing hole 41 and the air exhausting hole 16. The air introducing hole 41 is used for introducing air into an aerating portion 44 of the masking shield 42.

Figure 10A:
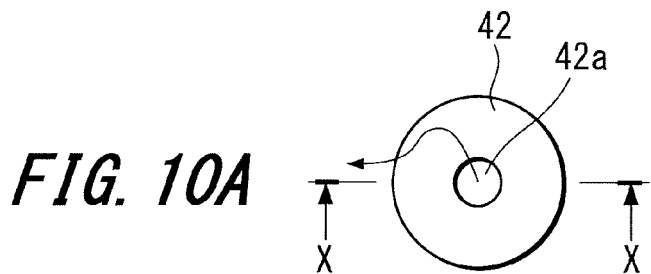
FIGS. 10A, 10B are respectively a top view and a cross-sectional view along the line X-X of a first masking shield according to the second embodiment of the present invention.
Figure 10B:

FIG. 10A, 10B illustrate a general view of the masking shield 42, and are respectively a top view and a cross-sectional view along the line X-X of a masking shield according to the second embodiment of the present invention.

Figure 11A:
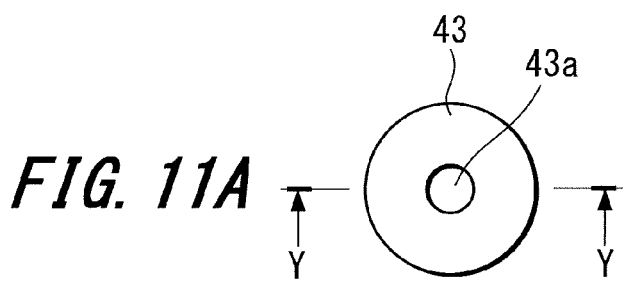
FIGS. 11A, 11B are respectively a top view and a cross-sectional view along the line Y-Y of a second masking shield according to the second embodiment of the present invention.
Figure 11B:

FIG. 11A, 11B illustrate a general view of the masking shield 43, and are respectively a top view and a cross-sectional view along the line Y-Y of a masking shield according to the second embodiment of the present invention. As shown in FIG. 10A, 10B, the masking shield 42 may either be a low cylinder hollow having an opening formed in part of bottoms, or a low cylinder having openings formed in both bottoms. The masking shield 42 has a full-opened opening in one bottom and an opening with a prescribed size in the other. The masking shield 42 has an approximately conical shape having a circular base located opposite side of the opening end and smooth curved sides ending in an opening 42a.

The diameter of the opening 42a formed in the bottom of the masking shield 42 is preferably approximately equal to or slightly larger than the diameter of the laser beam (diagonal size) passing through the masking shield 42. In this embodiment, the size of the opening 42a may be 0.5 mm to 1.0 mm larger than that of the laser beam. The debris 21 are generated around the laser irradiating area of the material 7 and drifted upwards to the upper transmitting window 9. Of these, the amount of the debris 21 that passes through the openings 42a, 43a of the masking shields 42, 43 can be minimized by having the aforementioned size of the opening 42a in the masking shield 42.

As shown in FIG. 11A, 11B, the masking shield 43 has an inverted otherwise the same form of the masking shield 42 with an opening 43a.

As shown in FIG. 9, the masking shields 42, 43 include the openings 42a, 43a formed in the bottoms. The masking shields 42, 43 are placed such that the bottoms of the masking shields are mutually faced with a prescribed distance. The masking shields 42 and 43 are placed so that the bottoms of the masking shields 42 and 43 are mutually faced and a space for an aerating portion 44 is interposed therebetween.

The masking shield having the masking shields 42 and 43 is placed so that the masking shield has the same height as those of the air exhausting hole 12 and an air introducing hole 41 inside the decompression chamber 11. Accordingly, the aerating portion 44 having the masking shields 42 and 43 can be communicated with the air introducing hole 41 and the air exhausting hole 16. The gas is introduced from the air introducing hole 41 to the aerating portion 44 of the masking shield based on the timing of introducing the gas via the air holes 17 or 18 of the gas introducing-exhausting unit 11a.

The debris 21 generated from the laser irradiating area of the material 7 are discharged via the air hole 17 communicated with the aperture 20 in the bottom of the decompression chamber, simultaneously with discharging the gas in the decompression chamber 11 via the exhausting hole 16. The debris 21 that are not discharged via the air hole 17 are entrapped with the bottom of the masking shield 42 and attached to the periphery of the opening 42a.

The debris 21 that is not entrapped with the masking shield 42 is introduced into the aerating portion 44 via the openings 42 and 43 of the respective masking shields 42 and 43. The introduced debris may be caused to flow in the aerating portion 44 by the gas via the air introducing hole 41 in the direction to the air exhausting hole 16 as shown in FIG. 10A. Thus, the debris in the aerating portion 44 is discharged via the air exhausting hole 16.

As already described, the second embodiment further provides such an effect in addition to the effect obtained in the first embodiment, that the debris is inhibited from being attached to the transmitting window for the laser beam by entrapping the debris using the masking shield while patterning the processing film on the multilayer thin film (resin film or thin metal film).

As a result, the more excellent effect can be obtained in laser processing with high precision while controlling debris attached to the material. This enables to have a broader range of applications in laser processing, and higher precision micro-patterning can be formed on the material at lower cost. Further, the method of laser processing according to this embodiment can decrease an adverse effect on the edges of the patterning due to heat or debris, and power consumption by removing the residue of the patterning. As a result, display panels can be fabricated with a high quality.

Next, a modification of the second embodiment of a laser processing device will be described with reference to FIGS. 12A to 12C.

Figure 12A:
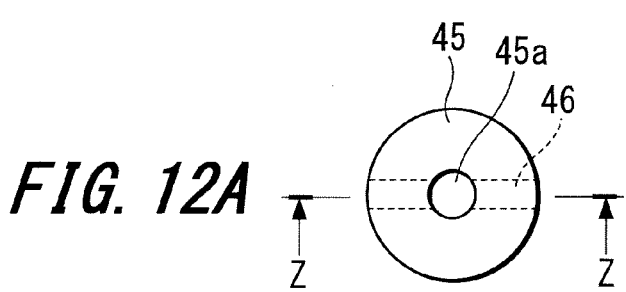
FIGS. 12A, 12B, 12C are respectively a top view, a cross-sectional view along the line Z-Z, and a side view of a third masking shield according to the second embodiment of the present invention.
Figure 12B:
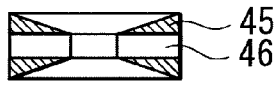
Figure 12C:
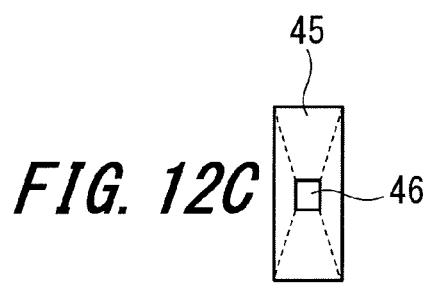

FIGS. 12A, 12B, 12C are respectively a top view, a cross-sectional view along the line Z-Z, and a side view of a masking shield 43 according to another modification of the second embodiment of the present invention. The masking shield 43 according to this modification includes masking shields 42 and 43 shown in FIG. 10 and FIG. 11, the bottoms of which are mutually faced with a prescribed distance therebetween. The aerating portion 46 is formed inside the masking shield 43 such that aerating portion 46 linearly passes through the opening 45a. Accordingly, the aerating portion 46 can linearly be communicated with the air introducing hole 46 and the air exhausting hole 16 in the masking shields 43 formed inside the decompression chamber 11. Thus, the debris introduced from the opening 45a of the masking shield 45 are caused to linearly flow to the air exhausting hole 16 via the aerating portion 46, this embodiment can improve efficiency in clearing and collecting the debris in comparison to the embodiment shown in FIG. 10.

It should be noted that although various technical definitions such as the kind of materials and the numerical values are given, the scope of the present invention is not limited to those examples unless there is a specific description to the effect that the present embodiments are limited thereto. It should be understood by those skilled in the art that various modifications, combinations, sub-combinations and alterations may occur depending on design requirements and other factors insofar as they are within the scope of the appended claims or the equivalents thereof.

What is claimed is:

1. A laser processing device comprising:
   a laser beam source irradiating a laser beam, and
   a laser processing head; the laser processing head including a transmitting window through which the laser beam passes to irradiate a material,
   an aperture formed in a bottom of the laser head and allowing the laser beam to pass through via the transmitting window,
   an introducing hole introducing a gas into the laser processing head,
   an exhausting hole discharging an ambient gas contained in the laser processing head to outside,
   a first air hole introducing the gas to the periphery of the laser irradiating area of the material,
   a second air hole placed to face the first air hole and allowing to discharge the ambient gas of the laser irradiating area of the material, and
   a masking shield having an opening placed between the transmitting window and the aperture, and an aerating portion communicated with the introducing hole and exhausting hole, wherein
   debris generated around a laser irradiating area of the material is discharged via the second air hole communicated with the opening formed in the bottom of the laser processing head, and are caused to attach to the periphery of the masking shield in patterning a resin film or thin metal film on a multilayer film formed in the material using a laser beam.

2. A laser processing device according to claim 1, wherein:
   a diameter of the opening provided in the masking shield is approximately equal to the diameter of the laser beam passing through the opening.

3. A laser processing device according to claim 2, wherein:
   the debris generated from the laser irradiating area of the material is introduced via the opening of the masking shield and discharged from the exhausting hole via the aerating portion simultaneously with discharging the gas via the second air hole.

4. A laser processing device according to claim 2, further comprising:
   a resin film formed on the lower layer of the thin metal film stacked on the multilayer film.

5. A laser processing device according to claim 2, wherein the aerating portion provided in the masking shield is communicated with the introducing hole and exhausting hole in an approximately linear manner.

6. A laser processing device according to claim 2, wherein an amount of the debris accumulated on the material is controlled by adjusting a diameter of an aperture of the laser processing head and a distance between the surface of the multilayer film of the material and the bottom of the laser processing head.

7. A laser processing device according to claim 2, wherein the material is irradiated with the first laser beam, a stage for mounting the material is then displaced a prescribed distance in the opposite direction to airflow moving from the first air hole to the second air hole, and part of a first irradiating area of the material irradiated with the first laser beam is subsequently irradiated twice with a second laser beam.

8. A laser processing device according to claim 2, further comprising:
   a function to discharge the gas from the periphery of a laser irradiated area of the material in addition to a function to introduce the gas to the periphery of a laser irradiated area of the material in the first air hole, and
   a function to introduce the gas to the periphery of a laser irradiated area of the material in addition to a function to discharge the gas from the periphery of a laser irradiated area of the material in the second air hole, wherein
   directions of introducing and discharging the gas between the first air hole and second air hole are switched according to patterning direction of the material.

9. A laser processing device according to claim 2, further comprising:
   a third air hole and a fourth air hole placed in a facing manner and in positions 90 degrees in radial direction relative to the first air hole and second air hole in the laser processing head such that the gas is introduced to or discharged from the periphery of the laser irradiating area of the material via the third air hole and fourth air hole, wherein
   one of an air hole pair having the first and second air holes, and an air hole pair having the third and fourth air holes is selected or switched.

10. A laser processing device according to claim 2, further comprising:
    a turning mechanism having the first and second air holes, and a turnable axis approximately in parallel with laser beam path in part of the laser processing head, wherein the turning mechanism is caused to turn in patterning direction of the material, and to switch directions of introducing and discharging the gas between the first air hole and second air hole.

11. A laser processing head comprising:
a transmitting window through which the laser beam passes to irradiate a material,
an aperture formed in a bottom of the laser head and allowing the laser beam to pass through via the transmitting window,
an introducing hole introducing a gas into the laser processing head,
an exhausting hole discharging an ambient gas contained in the laser processing head to outside,
a first air hole introducing the gas to the periphery of the laser irradiating area of the material,
a second air hole placed to face the first air hole and allowing to discharge the ambient gas of the laser irradiating area of the material, and
a masking shield having an opening placed between the transmitting window and the aperture, and an aerating portion communicated with the introducing hole and exhausting hole, wherein
debris generated around a laser irradiating area of the material is discharged via the second air hole communicated with the opening formed in the bottom of the laser processing head, and are caused to attach to the periphery of the masking shield in patterning a resin film or thin metal film on a multilayer film formed in the material using a laser beam.

12. A method of laser processing a resin film or thin metal film on a multilayer film formed in a material using a laser processing head having a transmitting window through which the laser beam passes, an aperture allowing the laser beam to pass through via the transmitting window, a first and second introducing holes introducing a gas into the laser processing head, a first and second exhausting holes discharging an ambient gas contained in the laser processing head to outside, a first air hole introducing the gas to the periphery of the laser irradiating area of the material, a second air hole placed to face the first air hole and allowing to discharge the ambient gas of the laser irradiating area of the material, and a masking shield having an opening placed between the transmitting window and the aperture, and an aerating portion communicated with the first introducing hole and first exhausting hole, the method comprising the steps of:
introducing a gas from the second introducing hole provided in a prescribed location of the laser processing head to the periphery of a laser irradiating area of the material,
introducing the gas into an aerating portion of the masking field via the first introducing hole,
irradiating the material with the first laser beam,
displacing a stage for mounting the material a prescribed distance in the opposite direction to airflow of the introduced gas,
discharging an ambient gas of the laser irradiating area of the material from the second introducing hole provided in the prescribed location of the laser processing head,
introducing the ambient gas inside the laser processing head from the opening of the masking shield and discharging the gas from the first exhausting hole via the aerating portion, and
irradiating part of a first irradiating area of the material twice with a second laser beam while discharging the gas via the first and second exhausting holes.

* * * * *